United States Patent
Augustsson (10) Patent No.: US 7,349,628 B2
(45) Date of Patent: Mar. 25, 2008

(54) MMI BASED DEVICE (75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 533 days.

(21) Appl. No.: 10/493,978

(22) PCT Filed: Nov. 6, 2002

(86) PCT No.: PCT/SE02/02018

§ 371 (c)(1),
(2), (4) Date: Aug. 17, 2004

(87) PCT Pub. No.: WO03/041319

PCT Pub. Date: May 15, 2003

(65) Prior Publication Data
US 2005/0008365 A1    Jan. 13, 2005

(30) Foreign Application Priority Data
Nov. 9, 2001   (SE) .................................. 0103725

(51) Int. Cl.
*H04J 14/00* (2006.01)
*G02B 6/26* (2006.01)
*G02B 6/34* (2006.01)

(52) U.S. Cl. ................. 398/45; 398/48; 398/82; 398/83; 385/17; 385/16; 385/24; 385/37; 385/43

(58) Field of Classification Search ............... 398/43, 398/45, 48–50, 68, 79, 82, 83; 385/15–37, 385/43, 47, 140
See application file for complete search history.

(56) References Cited

U.S. PATENT DOCUMENTS 5,889,906 A *  3/1999  Chen ............................ 385/28

(Continued)

FOREIGN PATENT DOCUMENTS

WO     WO 00/18042    3/2000

(Continued)

OTHER PUBLICATIONS

Leuthold et al: "Multimode Interference Coupler with Tunable Power Splitting Ratios", Journal of Lightwave Technology, vol. 19, No. 5, May 2001, p. 700-70.*

(Continued)

*Primary Examiner*—Kenneth Vanderpuye
*Assistant Examiner*—Li Liu (57) ABSTRACT

A device and method for multiplexing or demultiplexing M optical signals, each having a different wavelength $\lambda_m$. An MMI waveguide has a length such that each optical signal that propagates into the MMI waveguide at an i:th access waveguide, where $i \leq N$, and N is greater than or equal to 2, produces N self-images inside the MMI waveguide at a respective distance $I_m$ from the access waveguides. Each of M wavelength selective reflectors is arranged near a respective distance $I_m$, wherein the m:th reflector reflects the optical signal carried by the m:th wavelength, where $2 \leq m \leq M$, while being substantially transparent to all other wavelengths. Each of M phase adjustors is arranged relative to a corresponding reflector, wherein the m:th phase adjustor adjusts the phase of the self-images of the optical signal carried by the m:th wavelength to create a single self-image at a selected output access waveguide when reflected by the m:th reflector.

13 Claims, 6 Drawing Sheets

U.S. PATENT DOCUMENTS

| | | | |
|---|---|---|---|
| 5,953,467 A * | 9/1999 | Madsen | 385/15 |
| 6,005,992 A * | 12/1999 | Augustsson et al. | 385/16 |
| 6,108,478 A * | 8/2000 | Harpin et al. | 385/129 |
| 6,188,818 B1 * | 2/2001 | Han et al. | 385/24 |
| 6,345,136 B1 * | 2/2002 | Augustsson | 385/37 |
| 6,603,893 B1 * | 8/2003 | Liu et al. | 385/15 |
| 6,892,021 B2 * | 5/2005 | Doerr | 385/140 |
| 2002/0181832 A1 * | 12/2002 | Feng et al. | 385/15 |

FOREIGN PATENT DOCUMENTS

| WO | WO 01/33758 A1 | 5/2001 |
|---|---|---|
| WO | WO 01/73994 A1 | 10/2001 |

OTHER PUBLICATIONS

Augustsson: "Bragg grating assisted MMIMI coupler for wavelength selective switching", Electronics Letters, vol. 34, No. 25, Dec. 1998, p. 2416-2418.*

* cited by examiner

MMI BASED DEVICE

TECHNICAL FIELD

The present invention relates to an MMI based multiplexer and demultiplexer, a wavelength selective switch comprising an MMI waveguide, and a method for multiplexing, demultiplexing or switching M optical signals each having different wavelength.

BACKGROUND OF THE INVENTION

There is a strong need to increase the capacity and flexibility of photonic transport networks. The evolving telecommunication networks are increasingly focusing on flexibility and reconfigurability, which requires enhanced functionality of photonic integrated circuits (PICs) for optical communications, as well as compact devices. The interest for multi-mode interference (MMI) effects in integrated optics for single-mode transmission systems has recently been increasing. Optical devices based on MMI effects have large optical bandwidth, are polarization insensitive and sustain high fabrication tolerances to mention a few advantages. The operation of MMI waveguide devices is based on the self-imaging principle and is further described in "Optical Multi-Mode Interference Devices Based on Self-Imaging: Principles and Applications" by L. B Soldano and E. C. M. Pennings published in J. of Lightwave Technology, Vol. 13, No. 4 April 1995.

MMI waveguide devices have applications in a number of different areas, for instance, as a wavelength selective switch, as described in "Bragg-grating assisted MMIMI coupler for wavelength selective switching" by the present inventor published in Electronics Letters $10^{th}$ December 1998, Vol. 34, No. 25. In this paper the present inventor describes a novel optical device for wavelength selective switching. The device is based on a Bragg grating assisted MMIMI (Multi Mode Interference Michelson Interferometer) coupler.

Another application for a MMI waveguide device is as a coupler, as described in the paper "Multimode Interference Couplers with Tuneable Splitting Ratios" by J. Leuthold and C. H. Joyner, published in Proc. ECOC September 2000, München Vol. 3. In this paper the authors present a novel, compact multi-mode interference coupler with tuneable power splitting ratios. The coupler has large tuning ranges and is used to optimise on-off ratios in interferometric devices or is even used as a switch.

Multiplexing of optical signals is described in "Transmission Characteristics of Arrayed Waveguide N×N wavelength Multiplexer", in J. of Lightwave Technology Vol 13(3), pp 447-445, 1995 by H. takahasi, K. Oda, H. Toba and Y. Inoue.

The need to be able to multiplex or demultiplex optical signals in optical telecommunication networks is apparent. Simple space switching of broadband signals allows routing based on for instance available capacity or rerouting around parts of the network currently unavailable, and wavelength switching is an important feature of any flexible optical network.

SUMMARY OF THE INVENTION

It is a main object of the present invention to provide a device and method for multiplexing, demultiplexing or switching M optical signals each having different carrier wavelength.

These objects, among others, are according to a first aspect of the present invention, attained by a device for multiplexing or demultiplexing M optical signals, M being an integer and greater than or equal to 2 and each of the signals being carried by a different wavelength $\lambda_m$. The device comprises a multi-mode interference (MMI) waveguide having at a first side a number N of access terminals for connection of access waveguides, said MMI waveguide having dimensions, so that each of the optical signals, at the i:th access waveguide, $i \leq N$, propagating into said MMI waveguide will produce N self-images inside said MMI waveguide at a respective distance $l_m$ from said access terminals, where N is an integer greater than or equal to 2. The device further comprises M wavelength selective reflection means each of which is arranged in proximity of a respective one of said distances $l_m$, M phase adjusting means, each of which is arranged in relation to a corresponding wavelength selective reflection means, and wherein the m:th wavelength selective reflection means is arranged to reflect the optical signal carried by the m:th wavelength ($2 \leq m \leq M$), and the m:th phase adjusting means is arranged to adjust the phase of the self-images of the optical signal carried by the m:th wavelength to create a single self-image at a selected output access waveguide when reflected by said m:th wavelength selective reflection means.

These objects, among others, are according to a second aspect of the present invention, attained by a device for switching M optical signals, M being an integer and greater than or equal to 2, and each of the signals being carried by a different wavelength $\lambda_m$. The device comprises a multi-mode interference (MMI) waveguide having at a first side a number N of access terminals for connection of access waveguides, said MMI waveguide having dimensions, so that each of the optical signals, at the i:th access waveguide, $i \leq N$, propagating into said MMI waveguide will produce N self-images inside said MMI waveguide at a respective distance $l_m$ from said access terminals, where N is an integer greater than or equal to 2. The device further comprises M wavelength selective reflection means each of which is arranged in proximity of a respective one of said distances $l_m$, and M phase adjusting means, each of which is arranged in relation to a corresponding wavelength selective reflection means, wherein the m:th wavelength selective reflection means is arranged to reflect the optical signal carried by the m:th wavelength ($2 \leq m \leq M$), the m:th phase adjusting means is arranged to adjust the phase of the self-images of the optical signal carried by the m:th wavelength to create a single self-image at a selected output access waveguide when reflected by the m:th wavelength selective reflection means, and switch control means is arranged to control each of said phase adjusting means to dynamically selected said output access waveguide for each of said optical signals carried by said wavelengths.

These objects, among others, are according to a third aspect of the present invention, attained by a method for multiplexing, demultiplexing or switching M optical signals, N being an integer and greater than or equal to 2, each having a different wavelength $\lambda_m$, with the use of a multi-mode interference (MMI) waveguide having at a first side a number, N, of access terminals for connection of access waveguides, the MMI waveguide having dimensions, so that each of the optical signals, at the i:th access waveguide, $i \leq N$, propagating into said MMI waveguide will produce N self-images inside said MMI waveguide at a respective distance $l_m$ from said access terminals, where N is an integer greater than or equal to 2. The method comprises the steps of adjusting the phase of said self-images to create a single self-image, for the optical signal carried by the m:th wavelength, at a selected output access waveguide, and reflecting the optical signal carried by the m:th (2≦m≦M) wavelength at a position in the MMI waveguide where N self-images appear for said optical signal carried by the m:th wavelength.

In more detail, the N self-images for the m:th wavelength, originating from said optical signal entering said MMI waveguide at the i:th access waveguide, has each a phase $P_{n,i}$ ($P_{\#self\text{-}image,\# \text{ of input access waveguide}}$) construing a set $P_i$ describing a phase distribution of the self-images, and each of said M phase adjusting means is arranged to adjust the phase distribution $P_i$ for self-images from an input access waveguide i, for the m:th wavelength, to coincide with the phase distribution $P_j$ for a selected output access waveguide j.

Preferably, the method according to the third aspect of the invention comprises the further step of dynamically controlling the phase distribution $P_i$ for self-images from an input access waveguide i, for a selected wavelength, to coincide with the phase distribution $P_j$ for a dynamically selected output access waveguide j for said selected wavelength.

The M phase adjusting means is implemented, in a preferred embodiment according to the invention, by simply displacing each of said M wavelength selective reflection means in a direction of incident light, thereby the distance the light travels for each self-image is adjusted so as to adjust the phase of each self-image.

An advantage with the present invention is that a high total bandwidth, i.e. for all channels, can be achieved.

A further advantage of the present invention is that a small and flexible device is achieved.

Yet a further advantage is that high losses may be avoided.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 7, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
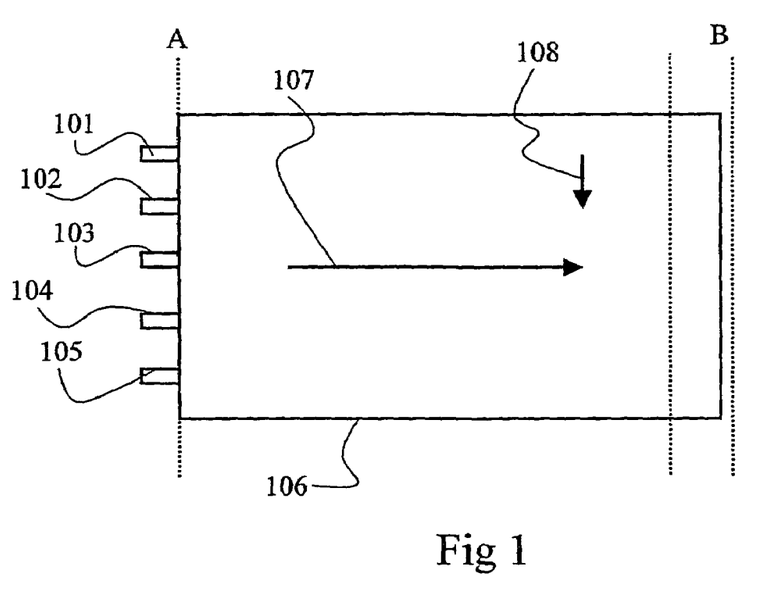
FIG. 1 shows a schematic view of a multi-mode interference device.

FIG. 1 shows a schematic drawing of a multi-mode interface device. To the left, at the interface A, are five access waveguides denoted 101 to 105 respectively. The length and width of the waveguide 106 are adapted so that an input image at an access waveguide will produce 5 self-images at the interface B. The light propagation direction is denoted 107 and the perpendicular direction 108. It shall be noted that the light also can propagate in the opposite direction to direction 107. A signal, entering on access waveguide 101, comprising 4 individually different signals, carried on different wavelengths, will produce 4 sets of self-images at the interface B slightly separated in the light propagation direction 107. The distance between each set of self-images will depend on the distances between the carrier wavelengths.

Figure 2:
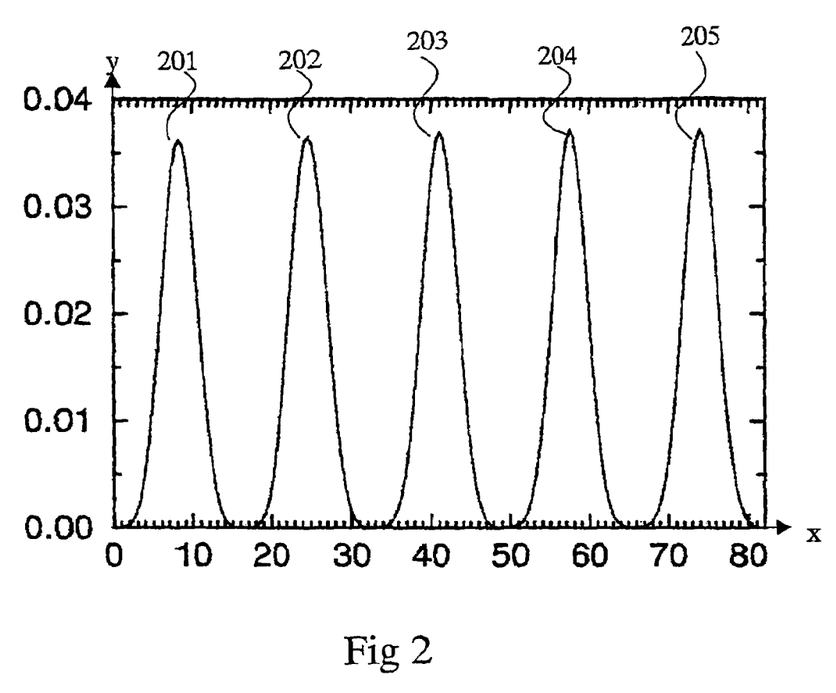
FIG. 2 shows a power distribution at the interface B, in FIG. 1, for a specific wavelength.

FIG. 2 shows the power distribution at the interface B for a signal entering the MMI waveguide in FIG. 1 at access waveguide 101. Each power peak, denoted 201-205, respectively, represents a self-image and appears evenly distributed at the interface B. In other words, the X-axis in FIG. 2 is oriented in FIG. 1 in the perpendicular direction 108.

Each individual wavelength will produce a similar power distribution in the perpendicular direction 108. However, the position for the power peaks for each individual wavelength in the light propagation direction 107 will differ so that a signal with a longer wavelength will have its peaks closer to the input access waveguides 101-105.

Input from the other access waveguides 102-105 will produce similar power distributions or self-images at the interface B. The power distribution difference at interface B between different input access waveguides will be negligible with a correct design of the MMI waveguide.

The optical bandwidth of a conventional MMI waveguide is inversely proportional to the number of input and output waveguides. Due to that the different channels have different path lengths in the MMI coupler according to the invention, this rule is no longer strictly true and, owing to this, a larger total bandwidth, i.e. for all channels, can be achieved. The bandwidth properties of MMI waveguides are more thoroughly worked out in "Optical Bandwidth and Fabrication Tolerances of Multimode Interference Couplers" by P. A. Besse, M Bachmann, H. Melchior, L. B. Soldano, and M. K. Smit published in J. of Lightwave Technology, Vol. 12, No. 6, June 1994.

Figure 3A:
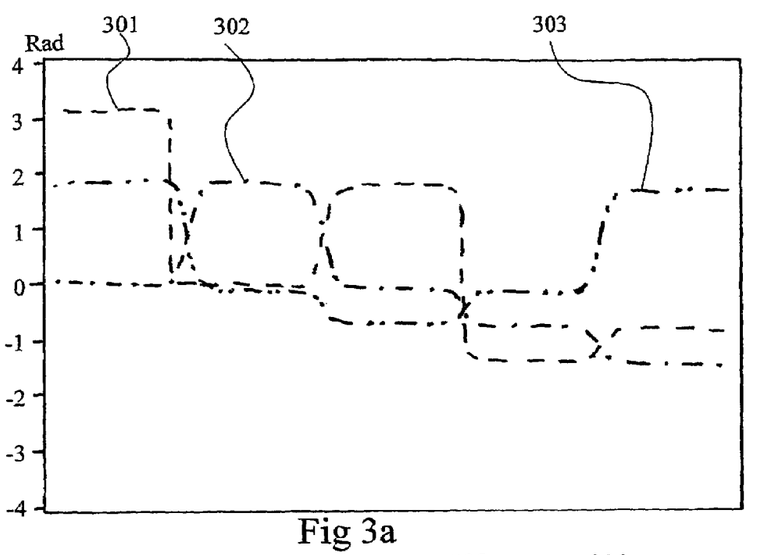
FIGS. 3a-3b show different phase distributions.

FIG. 3a shows phase distributions of self-images at interface B in FIG. 1 from the top three input waveguides 101-103. That is, a light image entering the MMI waveguide 106 in FIG. 1 at access waveguide 101 will have a power distribution according to FIG. 2 and a phase distribution according to dashed line 301 in FIG. 3a. A light image entering the MKI waveguide 106 at access waveguide 102 will have a power distribution similar to the power distribution in FIG. 2 but quite another phase distribution according to the dash-dot line denoted 302 in FIG. 3a. Similarly, an image entering the MMI waveguide at access 103 will have a phase distribution according to the dash-dot-dot line 303 in FIG. 3a.

Figure 3B:
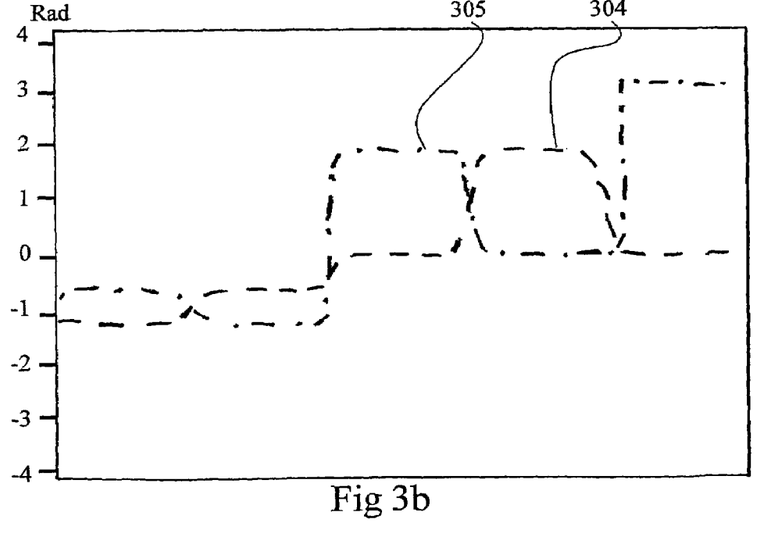

For ease of reference, the phase distribution of an image entering the MMI waveguide 106 at access waveguide 104 is plotted with a dashed line in FIG. 3b and denoted 304. Finally, the phase distribution of an image entering the MMI waveguide at the access waveguide 105 is plotted with a dash-dot line in FIG. 3b and denoted 305.

Thus, a phase distribution $P_i$, at interface B, for a signal entering MMI waveguide. 106 at an input access waveguide i, comprises a phase $P_{n,i}$ ($P_{\#self-image,\# of input access waveguide}$) for each power peak n in FIG. 2.

Figure 4:
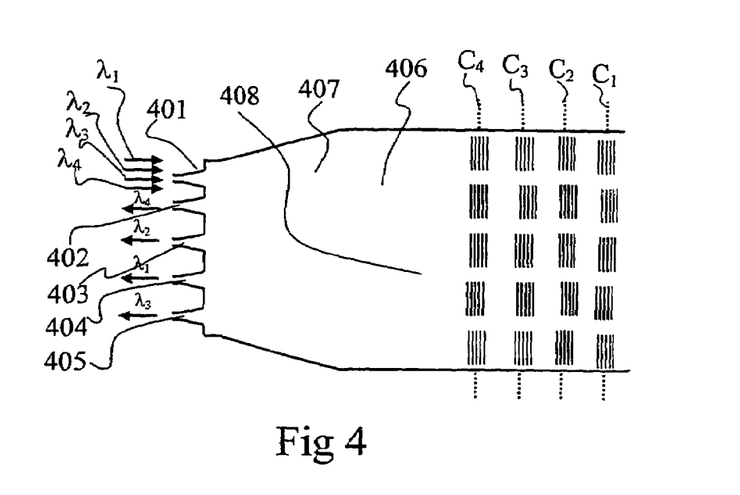
FIG. 4 shows a schematic view of a multiplexer/demultiplexer of a first preferred embodiment according to the invention in which each Bragg-grating is displaced with respect to the centreline.

FIG. 4 shows a schematic presentation of a preferred embodiment of the invention acting as a demultiplexer in more detail. Five access waveguides 401 to 405, respectively, are located on the left side of a MMI waveguide 406. The access waveguides 401 to 405 has a tapered part leading to the MMI waveguide 406. By using adiabatic tapering a greater part of the power will be in lower modes, a better bandwidth is achieved as well as lower loss and better fabrication tolerance. The MMI waveguide 406 has a first tapered part 407 leading to a second part having 20 Bragg-gratings arranged in four columns having centerlines $C_1$ to $C_4$, respectively. Each column is divided into 5 Bragg-gratings, which each are located with an offset to the respective column centerline. Each column centerline $C_i$ is located a distance $l_i$ from the input access waveguide, where $l_1 > l_2 > l_3 > l_4$.

A multiplexed optical signal enters on the top access waveguide 401, which thus is the input access waveguide. The multiplexed optical signal is consisting of four different optical signals carried on four different wavelengths, $\lambda_1$ to $\lambda_4$, separated with approx. 20 nm, where $\lambda_1 < \lambda_2 < \lambda_3 < \lambda_4$.

The Bragg-gratings in column $C_1$ is reflective to incident light with wavelength $\lambda_1$. The Bragg-gratings in column $C_2$ is reflective to incident light with wavelength $\lambda_2$ and transparent to other wavelengths. The Bragg-gratings in column $C_3$ is reflective to incident light with wavelength $\lambda_3$ and transparent to light with other wavelengths such as $\lambda_2$ and $\lambda_1$. Finally, the Bragg-gratings in column $C_4$ is reflective to incident light with wavelength $\lambda_4$ and transparent to other wavelengths such as $\lambda_3$ to $\lambda_1$.

The columns $C_1$ to $C_4$ are arranged at distances $l_1$ to $l_4$ so that five self-images for each wavelength $\lambda_1$ to $\lambda_4$ will appear at a corresponding distance, i.e. MMI waveguide 406 is arranged so that five self-images for wavelength $\lambda_1$ will appear approximately a distance $l_1$ from input access waveguide 401, five self-images for wavelength $\lambda_2$ will appear a distance $l_2$ from input access waveguide 401, five self-images for wavelength $\lambda_3$ will appear a distance $l_3$ from input access waveguide 401 and finally, five self-images for wavelength $\lambda_4$ will appear a distance $l_4$ from input access waveguide 401.

Put in a shorter form, a number M, equal to the number of input wavelengths, with columns of Bragg-gratings is arranged at a distance $l_m$, or with a slight offset, from the input access waveguide 401 where a number N, equal to the number of input and output access waveguides, of self-images is arranged to appear for the wavelength $\lambda_m$. Each column $C_m$ consists of N individual Bragg-gratings, and each Bragg-grating in each column is arranged to be reflective to incident light with wavelength $\lambda_m$ and transparent to incident light with other wavelengths.

In column $C_4$ each Bragg-grating is displaced from the centerline to adjust the phase of the incident light from wavelength $\lambda_4$ so that the phase $p_{n,i}$ for each self-image, when reflected by the Bragg-grating, is the same as the phase $P_{,2}$ which a similar image would have if it had entered the MMI waveguide on access waveguide 402. Since the MMI waveguide is reciprocal the incident light with wavelength $\lambda_4$ will be reflected, by the Bragg-gratings in column $C_4$, to access waveguide 402, which thus is the output access waveguide for signals carried by wavelength $\lambda_4$.

Similarly, in column $C_3$ each Bragg-grating is displaced from the centerline to adjust the phase of the incident light from wavelength $\lambda_3$ so that the phase $p_{n,i}$ for each self-image, when reflected by the Bragg-grating, is the same as the phase $p_{n,5}$ which a similar image would have if it had entered the MMI waveguide on access waveguide 405. Since the MMI waveguide is reciprocal the incident light with wavelength $\lambda_3$ will be reflected, by the Bragg-gratings in column $C_3$, to access waveguide 405, which thus is the output access waveguide for signals carried by wavelength $\lambda_3$.

In similar ways the signals carried by $\lambda_2$ and $\lambda_1$ are routed to output access waveguides 403 and 404, respectively. Thus the device depicted in FIG. 4 has demultiplexed the signal arriving at input access waveguide 401 to its respective output access waveguides 402 to 405.

It should be noted here that, since the MMI waveguide is reciprocal, the device in FIG. 4 could also work as a multiplexer. In that case, the device has four input access waveguides 402 to 405 for receiving four different signals carried by four different wavelengths, separated with approximately 20 nm. The device, working as a multiplexer, has only one output access waveguide 401, which outputs the multiplexed wavelengths.

Figure 5:
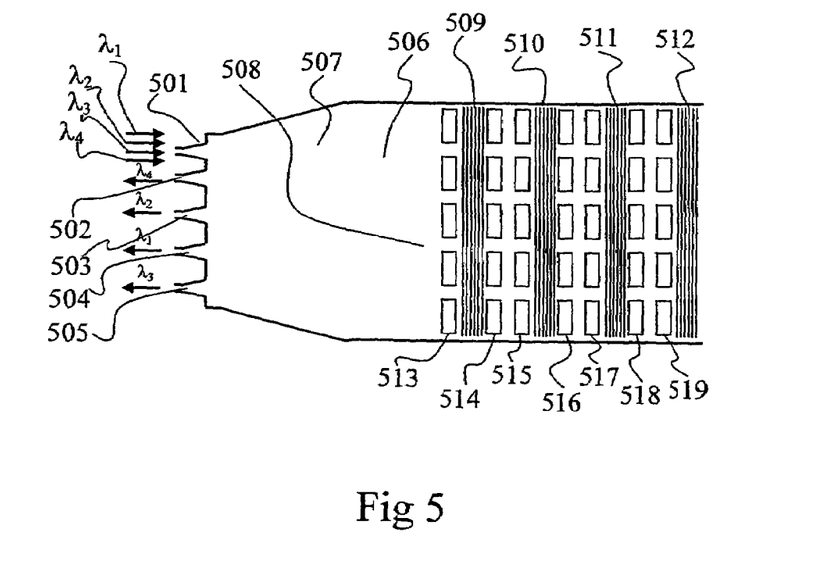
FIG. 5 shows a schematic view of a multiplexer/demultiplexer of a second preferred embodiment according to the invention in which phase adjusters are used.

FIG. 5 shows a second preferred embodiment according to the invention. An input access waveguide 501 receives four signals carried on four different wavelengths $\lambda_1$ to $\lambda_4$. The signals are demultiplexed and routed to four different output access waveguides 502 to 505, respectively as will be described below. A MMI waveguide 506 comprises a first tapered part 507 and a second part 508 comprising four wavelengths selective reflection means 509 to 512, respectively, as well as seven rows of phase adjusters 513 to 519 each with five individual phase adjusters.

Each Bragg-grating is arranged to be reflective to the corresponding wavelength and be transparent to other wavelengths. The phase adjustment is, in this embodiment, performed with special phase adjusters. Thus, the first row 513 of five phase adjusters adjust the phase distribution over the self-images of the incident light to correspond to the phase distribution of a signal entering the MMI waveguide 506 through fourth output access waveguide 505. The Bragg-grating 509 is arranged at a distance from said input access waveguide where five self-images of the fourth wavelength $\lambda_4$ will appear and is reflective with respect to this wavelength but>transparent to other wavelengths. Thus, the signal carried by the wavelength $\lambda_4$ will be reflected to the fourth output access waveguide 505 while the other wavelengths will pass through the Bragg-grating 509.

Since the phase of the incident light is tuned over a relatively long distance, i.e. during the travel through the phase shifters, the intensity distribution of the light changes during the distance through the phase shifters. By having an adiabatic tapering of the waveguide, i.e. with no or lower coupling to higher modes, a slower change of the intensity distribution of the incident light will occur. Thus, a more effective phase adjustment is achieved with reduced crosstalk and power loss. However, maybe the most important effect of the tapering is to reduce the spread of the effective refractive index (propagation constant) for the modes in the incident light. Since each mode will have a slightly different effective refractive index, and thus interact somewhat differently with the Bragg-gratings, it is important to minimize this effect. This is achieved with the tapering. This is true for all embodiments according to the invention.

The second row 514 of five phase adjusters is arranged to cancel out the phase adjustment performed by the first row 513 of phase adjusters. Thus, there is no need to consider the phase adjustment introduced by the first 513 and the second 514 row of phase adjusters, when designing phase adjustments further on, such as for the first, second and third signals carried by other wavelengths. This is true both for light traveling into the MMI waveguide as well as light traveling out of it.

The third row 515 of five phase adjusters is arranged to adjust the phase distribution over the self-images of the incident light to correspond to the phase distribution of a signal entering the MMI waveguide 506 through third output access waveguide 504. The Bragg-grating 510 is arranged at a distance from said input access waveguide where five self-images of the third wavelength $\lambda_3$ will appear and is reflective with respect to this wavelength but transparent to other wavelengths. Thus, the signal carried by the wavelength $\lambda_3$, will be reflected to the third output access waveguide 504 while the other wavelengths will pass through the Bragg-grating 510.

The fourth row 516 of phase adjusters cancel out the phase adjustment performed by the third row 515. The second wavelength is treated in a similar way. For the first wavelength, which is the shortest wavelength and also the last to be reflected, no phase adjustment is needed to cancel out the phase adjustments introduced by the seventh row 519 of five phase adjusters, since no signals will pass the Bragg-grating 512.

Thus, the device works as a demultiplexer for demultiplexing four signals or less, arriving on input access waveguide 501, carried-on four different wavelengths, to four different output access waveguides 502 to 505. The device may also function as a multiplexer for four signals (or less) received at access waveguides 502 to 505, working as input access waveguides, each being carried on a different wavelength. These signals will then be multiplexed and output on access waveguide 501, working as an output access waveguide.

Figure 6:
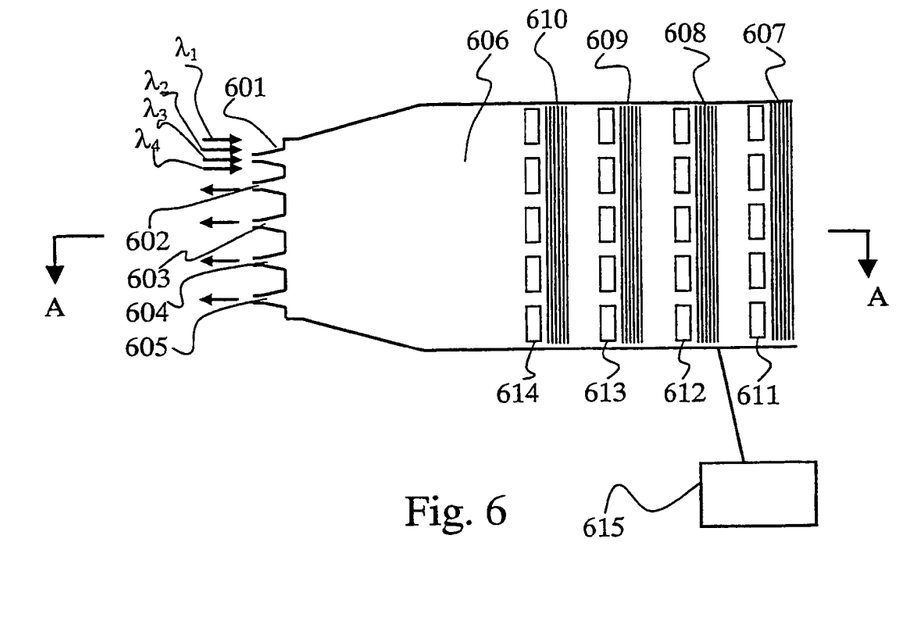
FIG. 6 shows a schematic view of a switch of a third preferred embodiment according to the invention.

FIG. 6 shows a third preferred embodiment according to the invention where dynamically controllable phase adjusters are used, thus allowing the device to be used as a wavelength selective switch.

Four optical signals, carried on four different wavelengths enter a MMI waveguide 606 on an input access waveguide 601. Each of the individually signals are routed to any of four dynamically selectable output access waveguides 602 to 605 as will be described in further detail below.

Similarly to the previous embodiment, four Bragg-gratings are arranged at distances from the input access waveguide where five self-images will appear for respective wavelength. The first Bragg-grating 607 is reflective with respect to the first wavelength $\lambda_1$. The second Bragg-grating 608 is reflective with respect to the second wavelength $\lambda_2$ and transparent with respect to other wavelengths. The third Bragg-grating 609 is reflective with respect to the third wavelength $\lambda_3$ and transparent with respect to other wavelengths. Finally, the fourth Bragg-grating 610 is reflective with respect to the fourth wavelength $\lambda_4$ and transparent with respect to other wavelengths.

The present embodiment only includes four rows 611 to 614 of five phase adjusters. Thus, it is necessary for later phase adjusters to consider the phase adjustment performed by earlier phase adjusters. Each of the 4*5=20 phase adjusters is individually controllable by a switch control means, schematically shown and denoted 615.

By dynamically controlling the first row 611 of phase adjusters, arranged in front of the first Bragg-grating 607, to adjust the phase distribution of an incident light image to correspond to the phase distribution of an incident light image from a selected output access waveguide the signal carried by the first wavelength $\lambda_1$ is routed to the selected output access waveguide. Similarly, by controlling the second row 612 of phase adjusters the signal carried by the second wavelength $\lambda_2$ is routed to the selected output access waveguide, by controlling the third row 613 of phase adjusters the signal carried by the third wavelength $\lambda_3$ is routed to the selected output access waveguide, and finally, by controlling the fourth row 614 of phase adjusters the signal carried by the fourth wavelength $\lambda_4$ is routed to the selected output access waveguide.

It shall be noted that it is possible to route all signals to the same output access waveguide, in which case the device is working as a space switch, or route two signals to a first output access waveguide and two signals to a second output access waveguide, in which case the device works as a combination of space and wavelength switch. It is also possible to receive signals on more than one input and dynamically route the signals to one output, in which case the device works as a dynamic multiplexer. Actually, total freedom with regards to dynamic selection of input and output accesses are achieved, for instance may a signal be routed back into the same access waveguide from which it entered the device.

Figure 7:
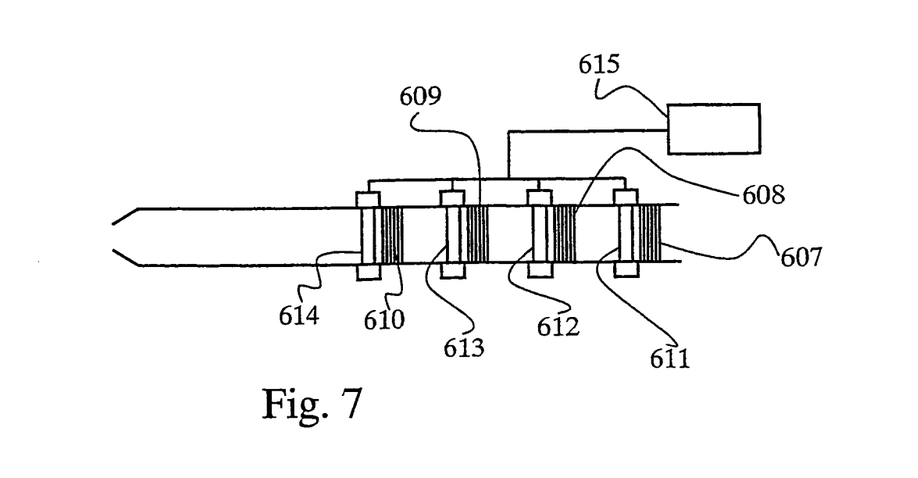
FIG. 7 shows a schematic cross-sectional view of the device in FIG. 6 taken at line A-A.

FIG. 7 shows the device in FIG. 6 taken at line A-A. The individually controllable phase adjusters are controllable by applying a voltage. Each phase adjuster comprises a media in which the refractive index is controllable by controlling a voltage across said media. By controlling the refractive index, the phase if incident light is controllable. According to another preferred embodiment thermo controllable or current controllable phase adjusters may be employed.

Figure 8:
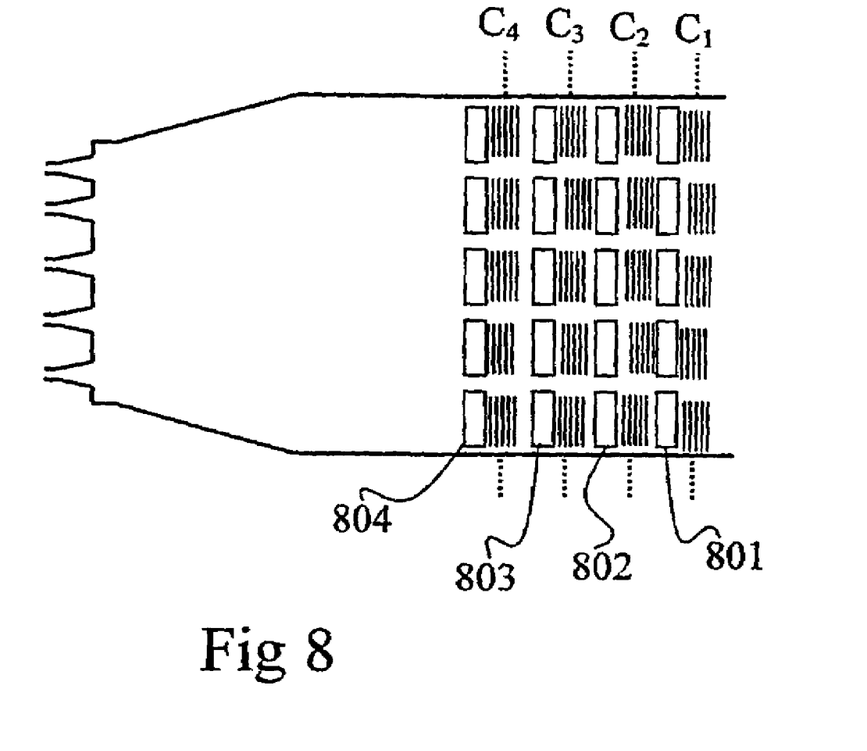
FIG. 8 shows a schematic view of a multiplexer/demultiplexer of a fourth preferred embodiment according to the invention in which each Bragg-grating is displaced with respect to the centreline and also incorporating phase adjusters.

FIG. 8 shows yet another preferred embodiment of a multiplexer/demultiplexer in which Bragg-gratings displaced from the centerline $C_1$-$C_4$ is used as well as phase adjusters 801-804. The phase adjusters are used to fine-tune the phase adjustment for each self-image.

The present invention is particularly suitable for implementation in a course wavelength division multiplexing, CWDM (having around 20 nm carrier wavelength separation), network.

It will be obvious that the invention may be varied in a plurality of ways. For instance, may the MMI waveguide comprise more or less than four access terminals. Such variations are not to be regarded as a departure from the scope of the invention. All such modifications as would be obvious to one skilled in the art are intended to be included within the scope of the appended claims.

The invention claimed is:

1. A device for multiplexing or demultiplexing M optical signals, M being an integer and greater than or equal to 2, and each of the signals being carried by a different wavelength $\lambda_m$, said device comprising:

a multi-mode interference (MMI) waveguide having at a first side, a number N of access terminals for connection of N access waveguides, each of the access waveguides having a tapered part leading to the MMI waveguide, and said MMI waveguide having a tapered part where the access waveguides connect leading to a second part of the MMI waveguide, said MMI waveguide having dimensions such that each of the optical signals propagating into the MMI waveguide at the i:th access waveguide, where i≦N, produces N self-images inside the MMI waveguide at a respective distance $I_m$ from the access terminals, where N is an integer greater than or equal to 2;

M wavelength selective reflection means arranged in the second part of the MMI waveguide, each of which is arranged in proximity of a respective one of the distances $I_m$, wherein the m:th wavelength selective reflection means is arranged to reflect the optical signal carried by the m:th wavelength, where 2≦m≦M;

M phase adjusting means arranged in the second part of the MMI waveguide, each of which is arranged in relation to a corresponding wavelength selective reflection means, wherein the m:th phase adjusting means is arranged to adjust the phase of the self-images of the optical signal carried by the m:th wavelength to create a single self-image at a selected output access waveguide when reflected by the m:th wavelength selective reflection means; and wherein the m:th wavelength selective reflective means is reflective to the m:th wavelength $\lambda_m$, and substantially transparent to all wavelengths $\lambda_k$, where $\lambda_k \neq \lambda_m$.

2. The device according to claim 1, wherein each of the N self-images from the optical signal, carried by the m:th wavelength, entering the MMI waveguide at the i:th access waveguide, has a phase $P_{n,i}$, construing a set $P_i$ describing a phase distribution of the self-images, and each of the M phase adjusting means is arranged to adjust the phase distribution $P_i$ for self-images from the optical signal carried on the m:th wavelength $\lambda_m$ from an input access waveguide i to coincide with the phase distribution $P_j$ for a selected output access waveguide j.

3. The device according to claim 1, wherein each of the M phase adjusting means comprises N individual phase shifters arranged in a line perpendicular to the propagation direction of incident light.

4. The device according to claim 1, wherein each of the M wavelength selective reflection means comprises N individual wavelength selective reflection means arranged substantially in a line perpendicular to the propagation direction of incident light.

5. The device according to claim 4, wherein each of the N wavelength selective reflection means is a Bragg-grating.

6. The device according to claim 5, wherein at least one of the phase adjusting means is achieved by each of the N wavelength selective reflection means being displaced, in light propagation direction, from the centre line to adapt the light travelling distance for incident light so as to adjust the phase distribution $P_i$, at the position of the given wavelength selective reflection means, for self-images from an input access waveguide i, to coincide with the phase distribution $P_j$ for a selected output access waveguide j.

7. The device according to claim 3, wherein the phase shifters, for adjusting the phase of a self-image, are arranged in front, in light propagation direction, of each of the M×N wavelength selective reflective means.

8. The device according to claim 3, wherein the phase shifters, for adjusting the phase of a self-image, comprise a first part arranged in front of each of the M×N wavelength selective reflective means, in light propagating direction, and a second part arranged behind each of the M×N wavelength selective reflective means.

9. A device for switching M optical signals, M being an integer and greater than or equal to 2, and each of the signals being carried by a different wavelength $\lambda_m$, said device comprising:

a multi-mode interference (MMI) waveguide having at a first side, a number N of access terminals for connection of N access waveguides, each of the access waveguides having a tapered part leading to the MMI waveguide, and said MMI waveguide having a tapered part where the access waveguides connect leading to a second part of the MMI waveguide, said MMI waveguide having dimensions such that each of the optical signals propagating into the MMI waveguide at the i:th access waveguide, where i≦N. produces N self-images inside the MMI waveguide at a respective distance $I_m$ from the access terminals, where N is an integer greater than or equal to 2;

M wavelength selective reflection means arranged in the second part of the MMI waveguide, each of which is arranged in proximity of a respective one of the distances $I_m$, wherein the m:th wavelength selective reflection means is arranged to reflect the optical signal carried by the m:th wavelength, where 2≦m≦M;

M phase adjusting means arranged in the second part of the MMI waveguide, each of which is arranged in relation to a corresponding wavelength selective reflection means, wherein the m:th phase adjusting means is arranged to adjust the phase of the self-images of the optical signal carried by the m:th wavelength to create a single self-image at a selected output access waveguide when reflected by the m:th wavelength selective reflection means; and switch control means arranged to control each of the phase adjusting means to dynamically select the output access waveguide for each of the optical signals carried by the wavelengths;

wherein the m:th wavelength selective reflective means is reflective to the m:th wavelength $\lambda_m$, and substantially transparent to all wavelengths $\lambda_k$, where $\lambda_k \neq m$.

10. The device according to claim 9, wherein each of the phase adjusting means includes a light-transparent part having an adjustable refractive index controllable by application of current, voltage, or heat, and the switch control means is arranged to control the phase distribution for a self-image by controlling the current, voltage, or heat applied to each of the phase adjusting means.

11. A method for multiplexing, demultiplexing or switching M optical signals, M being an integer and greater than or equal to 2, each having a different wavelength $\lambda_m$, with the use of a multi-mode interference (MMI) waveguide having at a first side a number, N, of access terminals for connecting N access waveguides, said method comprising the steps of:

tapering each of the access waveguides in a tapered part leading to the MMI waveguide;

tapering the MMI waveguide in a first part where the access waveguides connect;

sizing the MMI waveguide such that each of the optical signals propagating into the MMI waveguide at the i:th access waveguide, where i≦N, produces N self-images inside the MMI waveguide at a respective distance $I_m$ from the access terminals, where N is an integer greater than or equal to 2;

arranging each of M wavelength selective reflectors in a second part of the MMI waveguide in proximity of a respective one of the distances $I_m$, and wherein the m:th of the wavelength selective reflectors is reflective to the m:th wavelength $\lambda_m$, and substantially transparent to all wavelengths $\lambda_k$, where $\lambda_k \neq \lambda_m$;

adjusting the phase of the self-images to create a single self-image, for the optical signal carried by the m:th wavelength, at a selected output access waveguide; and reflecting the optical signal carried by the m:th wavelength, where $2 \leq m \leq M$, at a position in the MMI waveguide where N self-images appear for the optical signal carried by the m:th wavelength.

12. The method according to claim 11, wherein each of the N self-images from the optical signal carried by the m:th wavelength, entering the MMI waveguide at the i:th access waveguide, has a phase $P_{n,i}$, construing a set $P_i$ describing a phase distribution of the self-images, and the method further comprises adjusting the phase distribution $P_i$ for self-images from an input access waveguide i, for the optical signal carried by the m:th wavelength, to coincide with the phase distribution $P_j$ for a selected output access waveguide j.

13. The method according to claim 12, further comprising dynamically controlling the phase adjusting to adjust the phase distribution $P_i$ for self-images from an input access waveguide i, for the optical signal carried by a selected wavelength, to coincide with the phase distribution $P_j$ for a dynamically selected output access waveguide j for the selected wavelength.

* * * * *